United States Patent
Maki et al.

(10) Patent No.: US 11,732,113 B2
(45) Date of Patent: Aug. 22, 2023

(54) PUNCTURE SEALANT

(71) Applicant: SUMITOMO RUBBER INDUSTRIES, LTD., Kobe (JP)

(72) Inventors: Takashi Maki, Kobe (JP); Masato Nakagawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/505,836

(22) Filed: Oct. 20, 2021

(65) Prior Publication Data

US 2022/0153965 A1    May 19, 2022

(30) Foreign Application Priority Data

Nov. 18, 2020  (JP) ................ 2020-191819

(51) Int. Cl.
  *C08L 7/02*   (2006.01)
  *B29C 73/16*  (2006.01)
  *C08K 5/00*   (2006.01)
  *C08K 5/053*  (2006.01)

(52) U.S. Cl.
  CPC .............. *C08L 7/02* (2013.01); *B29C 73/163* (2013.01); *C08K 5/005* (2013.01); *C08K 5/053* (2013.01)

(58) Field of Classification Search
  CPC .............. B29C 73/16; C08K 5/13; C08L 7/00
  See application file for complete search history.

(56) References Cited

U.S. PATENT DOCUMENTS

| | | | | |
|---|---|---|---|---|
| 7,388,041 B2 * | 6/2008 | Cegelski | ............... | B29C 73/163 523/166 |
| 2020/0063003 A1 * | 2/2020 | Maki | ............... | C09J 107/02 |
| 2020/0086594 A1 * | 3/2020 | Okamatsu | ............. | B29C 73/163 |

FOREIGN PATENT DOCUMENTS

| | | | |
|---|---|---|---|
| EP | 2 157 150 A1 | 2/2010 | |
| JP | 2001-198986 A | 7/2001 | |
| JP | 6510259 B2 * | 5/2019 | |
| WO | WO 2008/142967 A1 | 11/2008 | |
| WO | WO-2018021239 A1 * | 2/2018 | ............. B29C 73/02 |

OTHER PUBLICATIONS

AkroChem (Akrosperse Aqueous Slurries and Emulsions, 2016, 2 pages).*
Machine translation of JP 6510259 (2019, 5 pages).*

* cited by examiner

*Primary Examiner* — Brieann R Johnston
(74) *Attorney, Agent, or Firm* — Birch, Stewart, Kolasch & Birch, LLP

(57) ABSTRACT

Provided is a tire puncture sealant having excellent puncture seal durability. The present disclosure relates to a puncture sealant containing at least one natural rubber latex, at least one antioxidant, at least one antifreezing agent, and at least one selected from the group consisting of protease inhibitors and phosphatase inhibitors.

8 Claims, No Drawings

PUNCTURE SEALANT

TECHNICAL FIELD

The present disclosure relates to a puncture sealant for use in a puncture repair system of a type that sequentially injects a puncture sealant and high-pressure air into a punctured tire through an air valve on the tire wheel.

BACKGROUND ART

Known systems for temporarily repairing a punctured tire include, for example, a system in which a pressure-proof container containing a puncture sealant and a high pressure air source such as a compressor are used to inject the sealant into a tire through the air valve, followed by continuously injecting high-pressure air until the tire is pumped up to a sufficient pressure for driving (hereinafter also referred to as the integrated system) (see, for example, FIG. 1 of JP 2001-198986 A which is incorporated herein by reference).

In general, a puncture sealant is provided inside a car or in the trunk room or the like and is used only when a puncture occurs. Thus, it is necessary to reduce deterioration of the puncture sealant until use. However, it is known that when a puncture sealant based on synthetic rubber is stored for a long time, the synthetic rubber undergoes gelation, resulting in a deterioration in puncture repair performance. The gelation of the synthetic rubber has been reduced by adding an antioxidant such as a monophenolic antioxidant (see Patent Literature 1).

CITATION LIST

Patent Literature

Patent Literature 1: WO 2008/142967

SUMMARY OF DISCLOSURE

Technical Problem

Patent Literature 1 discloses only a puncture sealant based on synthetic rubber and does not examine any puncture sealant based on natural rubber. We therefore conducted studies on deterioration of a puncture sealant based on natural rubber latex and found that the puncture sealant causes the following problem that is different from that with synthetic rubber: when the puncture sealant is stored in a resin bottle for a long time, the oxygen permeated through the resin bottle degrades the natural rubber so that it has a reduced molecular weight and may not solidify during puncture repairing, resulting in difficulty in sufficient repairing and thus a reduction in puncture seal durability (the ability of the long-term stored puncture sealant to reduce a decrease in tire pressure after puncture repairing).

Natural rubber proteins, which, for example, can act as allergens, are usually not considered as favorable components. Thus, a person skilled in the art generally tends to decompose the proteins, e.g., by adding a proteolytic enzyme. However, the present inventors have focused on the fact that the proteins in a puncture sealant based on natural rubber latex can act to protect dispersion and improve adhesive strength. Thus, we have changed the mindset and have conceived the idea that the performance can be enhanced by intentionally protecting the proteins. Then, we have found that by adding a protease inhibitor or phosphatase inhibitor to the puncture sealant to protect the proteins, it is possible to reduce age deterioration of the puncture sealant and prevent a reduction in puncture seal durability. This finding has led to the completion of the present disclosure.

The present disclosure aims to solve the above problem and provide a tire puncture sealant having excellent puncture seal durability.

Solution to Problem

The present disclosure relates to a puncture sealant, containing:
at least one natural rubber latex;
at least one antioxidant;
at least one antifreezing agent; and
at least one selected from the group consisting of protease inhibitors and phosphatase inhibitors.

Advantageous Effects of Disclosure

The puncture sealant of the present disclosure contains at least one natural rubber latex, at least one antioxidant, at least one antifreezing agent, and at least one selected from the group consisting of protease inhibitors and phosphatase inhibitors and thus has excellent puncture seal durability.

DESCRIPTION OF EMBODIMENTS

The puncture sealant of the present disclosure contains at least one natural rubber latex, at least one antioxidant, at least one antifreezing agent, and at least one selected from the group consisting of protease inhibitors and phosphatase inhibitors. Since deterioration of the puncture sealant, even when stored for a long time, is reduced, even the stored puncture sealant can provide good puncture repairing. Thus, even the long-term stored puncture sealant can prevent a decrease in tire pressure after puncture repairing, resulting in excellent puncture seal durability.

The present disclosure uses a puncture sealant containing one or more natural rubber latexes as main components to provide the following properties: for example, the sealant can be smoothly injected into a tire; the sealant can rapidly fill a puncture hole during driving and then can solidify in response to the mechanical stimuli due to the deformation of the tire to seal the puncture hole (initial sealing performance); and the sealant can maintain the sealing performance during driving a certain distance (seal retention performance).

The natural rubber latexes may further be blended with synthetic rubber latexes such as polybutadiene rubbers, styrene-butadiene rubbers, acrylonitrile-butadiene rubbers, ethylene-vinyl acetate rubbers, chloroprene rubbers, vinylpyridine rubbers, and butyl rubbers, as needed.

The term "rubber latex" refers to one in which fine particles of rubber solids are emulsified and dispersed in an aqueous medium containing a small amount of a surfactant as an emulsifier. The rubber latex to be used is usually adjusted to have a rubber solid content of approximately 60% by mass.

From the standpoints of initial sealing performance and seal retention performance, the amount of the natural rubber latexes (in terms of rubber solids) is preferably in the range of 15 to 45% by mass based on 100% by mass of the total puncture sealant. The lower limit of the amount is more preferably 20% by mass or more, still more preferably 22% by mass, while the upper limit is more preferably 40% by mass or less, still more preferably 35% by mass or less. With an amount not lower than the lower limit, good puncture sealing performance and seal retention performance tend to be obtained. Conversely, with an amount not higher than the upper limit, good storability, such as reduced agglomeration of rubber particles during storage, tends to be obtained, and an increase in viscosity tends to be reduced to ensure injectability of the puncture sealant through the air valve.

The puncture sealant contains at least one antioxidant. This tends to provide a good sealing effect in puncture repairing after long-term storage.

The antioxidant may be any antioxidant, including those which may be used to prevent deterioration of crosslinked rubbers. Suitable examples include phenolic antioxidants (e.g., monophenolic antioxidants, bisphenolic antioxidants, and polyphenolic antioxidants) and amine antioxidants. Phenolic antioxidants are preferred among these, with polyphenolic antioxidants being more preferred. These antioxidants may be used alone or in combinations.

Examples of the monophenolic antioxidants include styrenated phenol, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, branched nonylphenols (e.g., 2,6-di-nonyl-4-methylphenol), 2,4-dimethyl-6-(1'-methylundec-1'-yl)phenol, 2,4-dimethyl-6-(1'-methylheptadec-1'-yl) phenol, and 2,4-dimethyl-6-(1'-methyltridec-1'-yl)phenol.

Examples of the bisphenolic antioxidants include 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis (4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, and 1,1,5,5-tetrakis(5-tert-butyl-4-hydroxy-2-methylphenyl) pentane.

Examples of the polyphenolic antioxidants include 2,5-di-t-butylhydroquinone, tetrakis[methylene-3-(3',5'-di-t-butyl-4'-hydroxyphenyl)propionate]methane, and flavonoids (e.g., catechin, anthocyanin, flavone glycosides, isoflavone glycosides, flavan glycosides, flavanone, and rutin glycosides).

Examples of the amine antioxidants include amides of β-(3,5-di-tert-butyl-4-hydroxyphenyl)propionic acid, such as N,N'-bis(3,5-di-tert-butyl-4-hydroxyphenyl propionyl) hexamethylenediamine, N,N'-bis(3,5-di-tert-butyl-4-hydroxyphenyl propionyl)trimethylenediamine, N,N'-bis(3,5-di-tert-butyl-4-hydroxyphenyl propionyl)hydrazine, N,N'-bis[2-(3-[3,5-di-tert-butyl-4-hydroxyphenyl]propionyloxy) ethyl]oxamide, and 4,4'-bis(α,α-dimethylbenzyl) diphenylamine.

The amount of the antioxidants is not limited, but it is preferably 0.01 to 5 parts by mass per 100 parts by mass of the solids in the natural rubber latexes. The lower limit of the amount is more preferably 0.1 parts by mass or more, still more preferably 0.3 parts by mass or more, while the upper limit is more preferably 3 parts by mass or less, still more preferably 1 part by mass or less. With an amount not lower than the lower limit, a decrease in the molecular weight of the natural rubbers tends to be reduced so that good puncture sealing performance can be maintained. With an amount not higher than the upper limit, an economic advantage tends to be obtained.

The amount of the antioxidants based on 100% by mass of the total puncture sealant is preferably 0.01 to 3% by mass. The lower limit of the amount is more preferably 0.05% by mass or more, still more preferably 0.1% by mass or more, while the upper limit is more preferably 1% by mass or less, still more preferably 0.5% by mass or less. With an amount not lower than the lower limit, a decrease in the molecular weight of the natural rubbers tends to be reduced so that good puncture sealing performance can be maintained. With an amount not higher than the upper limit, an economic advantage tends to be obtained.

The antioxidants are preferably dispersed in the natural rubber latexes. The antioxidants can be dispersed in any way and may be dispersed in water using a surfactant and then in the natural rubber latexes.

The present disclosure may use any antifreezing agent and examples include ethylene glycol, propylene glycol (1,2-propanediol), and 1,3-propanediol. These may be used alone or in combinations.

The use of ethylene glycol may deteriorate the stability of rubber particles and cause their agglomeration. On the other hand, the use of propylene glycol or 1,3-propanediol can inhibit the rubber particles and tackifier particles from agglomerating around the surface and changing into a creamy substance, even after long-term storage. Thus, excellent storability (storage stability) can be provided. Moreover, the use of propylene glycol may cause an increase in viscosity at low temperatures, whereas the use of 1,3-propanediol can reduce an increase in viscosity at low temperatures, thus improving injectability at low temperatures. The use of 1,3-propanediol can increase the operating temperature range of the sealant to a lower temperature. Thus, clogging of the valve core can be prevented during the injection of the sealant and air through the valve core in an integrated puncture repair system, even at low temperatures.

The amount of the antifreezing agents based on 100% by mass of the total puncture sealant is preferably 20 to 64% by mass. With an amount not lower than the lower limit, an increase in viscosity at low temperatures tends to be reduced, while with an amount not higher than the upper limit, good puncture sealing performance tends to be obtained. The lower limit of the amount is more preferably 25% by mass or more, while the upper limit is more preferably 40% by mass or less.

The amount of the antifreezing agents based on 100% by mass of the liquid components of the puncture sealant is preferably 30 to 80% by mass. With an amount not lower than the lower limit, an increase in viscosity at low temperatures tends to be reduced, while with an amount not higher than the upper limit, good injectability tends to be obtained. The lower limit of the amount is more preferably 48% by mass or more, still more preferably 50% by mass or more, while the upper limit is more preferably 70% by mass or less. The liquid components herein refer to water and antifreezing agents. Thus, the amount means the amount calculated from the equation: (mass of antifreezing agents)/ (combined mass of water and antifreezing agents)×100 (% by mass).

The puncture sealant contains at least one selected from the group consisting of protease inhibitors and phosphatase inhibitors. This can reduce deterioration of natural rubber proteins and provide a good sealing effect in puncture repairing, even after long-term storage.

The protease inhibitors may be any one having a protease inhibitory effect, and examples include serine protease inhibitors, cysteine protease inhibitors, and metal protease inhibitors. These protease inhibitors may be used alone or in admixture of two or more. Preferred among these are metal protease inhibitors.

The serine protease inhibitors may be any one having a serine protease inhibitory effect. Examples include 4-(2-aminoethyl)benzenesulfonyl fluoride (AEBSF), benzamidine, aprotinin, bestatin, E-64 (Cayman Chemical), leupeptin, pepstatin A, inhibitor cocktails (Thermo Shientific) which are mixtures of the foregoing, a trypsin inhibitor (derived from soybean), phenylmethylsulfonyl fluoride (PMSF), and tosyllysine chloromethyl ketone (TLCK).

The cysteine protease inhibitors may be any one having a cysteine protease inhibitory effect. Examples include cysteine protease inhibitors such as iodine acetamide, iodoacetic acid, and E-64. Other examples include cysteine protease inhibitors such as TPCK (N-tosyl-L-phenylalanylchloromethyl ketone) and aspartic acid and salts thereof.

The metal protease inhibitors may be any one having a metal protease inhibitory effect (any inhibitor that can inhibit the activity of a metal protease by sequestering the metal ions). Examples include chelating agents and 1,10-phenanthroline. The chelating agents may be any known one, and examples include dibasic acids such as oxalic acid, adipic acid, and succinic acid; tribasic acids such as citric acid; polyphenols such as catechin, epigallocatechin, and tannic acid; and phytic acid and ethylenediaminetetraacetic acid and/or salts thereof. Preferred among these are dibasic acids, tribasic acids, ethylenediaminetetraacetic acid and/or salts thereof, and 1,10-phenanthroline, with ethylenediaminetetraacetic acid and/or salts thereof or 1,10-phenanthroline being more preferred. The ethylenediaminetetraacetic acid and/or salts thereof are referred to as edetic acid or ethylenediaminetetraacetic acid (EDTA), and examples include disodium edetate, trisodium edetate, tetrasodium edetate dihydrate, and tetrasodium edetate tetrahydrate.

The phosphatase inhibitors may be any one having a phosphatase inhibitory effect. Examples include phosphatase inhibitors such as sodium orthovanadate and sodium fluoride. Other examples include inhibitors of serine or threonine phosphatases (e.g., PPP family or PPM family) and inhibitors of tyrosine phosphatases (PTP family). Preferred among these is sodium orthovanadate.

The combined amount of the protease inhibitors and the phosphatase inhibitors is not limited, but it is preferably 0.001 to 2 parts by mass per 100 parts by mass of the solids in the natural rubber latexes. The lower limit of the combined amount is more preferably 0.02 parts by mass or more, still more preferably 0.03 parts by mass or more, while the upper limit is more preferably 0.5 parts by mass or less, still more preferably 0.2 parts by mass or less. With a combined amount not lower than the lower limit, a decrease in the molecular weight of the natural rubbers tends to be reduced so that good puncture sealing performance can be maintained. With a combined amount not higher than the upper limit, an economic advantage tends to be obtained. It should be noted that the amount of the protease inhibitors or phosphatase inhibitors alone is suitably in the same range as indicated above.

The combined amount of the protease inhibitors and the phosphatase inhibitors based on 100% by mass of the total puncture sealant is preferably 0.001 to 0.5% by mass. The lower limit of the combined amount is more preferably 0.01% by mass or more, still more preferably 0.02% by mass or more, while the upper limit is more preferably 0.3% by mass or less, still more preferably 0.1% by mass or less. With a combined amount not lower than the lower limit, a decrease in the molecular weight of the natural rubbers tends to be reduced so that good puncture sealing performance can be maintained. With a combined amount not higher than the upper limit, an economic advantage tends to be obtained. It should be noted that the amount of the protease inhibitors or phosphatase inhibitors alone is suitably in the same range as indicated above.

The puncture sealant preferably contains one or more tackifiers. The tackifiers refer to materials used to increase adhesion between the rubber latex and the tire and thereby improve puncture sealing performance. For example, a tackifying resin emulsion (oil-in-water emulsion) may be used in which fine particles of a tackifying resin are emulsified and dispersed in an aqueous medium containing a small amount of an emulsifier. The tackifying resin, which corresponds to the solids in the tackifying resin emulsion, may preferably be one that does not coagulate the rubber latex, such as a terpene resin, a phenolic resin, or a rosin resin. Other preferred examples of the resin include polyvinyl esters, polyvinyl alcohol, and polyvinyl pyrrolidine.

The amount of such tackifying resins (the solids in the tackifiers) based on 100% by mass of the total puncture sealant is preferably 2 to 10% by mass. The lower limit of the amount is more preferably 4% by mass or more, while the upper limit is more preferably 7% by mass or less. With an amount not lower than the lower limit, good puncture sealing performance and seal retention performance tend to be obtained. With an amount not more than the upper limit, good storability, such as reduced agglomeration of rubber particles during storage, tends to be obtained, and an increase in viscosity tends to be reduced to ensure injectability of the puncture sealant through the air valve.

The sum (in terms of solids) of the amount of the natural rubber latexes (in terms of rubber solids) and the amount of the tackifying resins (the solids in the tackifiers) based on 100% by mass of the total puncture sealant is preferably in the range of 15 to 60% by mass. The lower limit of the sum is more preferably 17% by mass or more, still more preferably 20% by mass or more, while the upper limit is more preferably 55% by mass or less, still more preferably 50% by mass or less.

The puncture sealant preferably contains one or more surfactants.

Examples of the surfactants include anionic surfactants, nonionic surfactants, and cationic surfactants.

Preferred among these are nonionic surfactants.

Polyoxyalkylene alkyl ethers and/or polyoxyalkylene alkenyl ethers are preferred as the nonionic surfactants.

The nonionic surfactants (e.g., polyoxyalkylene alkyl ethers and polyoxyalkylene alkenyl ethers) preferably have an ethylene oxide structure and/or a propylene oxide structure, more preferably an ethylene oxide structure. In the nonionic surfactants having an ethylene oxide structure and/or a propylene oxide structure, the average number of moles of ethylene oxide (EO) and propylene oxide (PO) added (the sum of the average numbers of moles of EO and PO added) is preferably 10 or greater, more preferably 13 or greater, but is preferably 80 or smaller, more preferably 60 or smaller, still more preferably 40 or smaller.

The number of carbon atoms of the alkyl groups in the polyoxyalkylene alkyl ethers and the number of carbon atoms of the alkenyl groups in the polyoxyalkylene alkenyl ethers are each preferably 10 or greater, more preferably 12 or greater, but are each preferably 20 or smaller, more preferably 18 or smaller.

Examples of the polyoxyalkylene alkyl ethers and the polyoxyalkylene alkenyl ethers include compounds represented by the following formula (1):

$$R^1\text{—}O\text{-}(AO)_n\text{—}H \qquad (1)$$

wherein $R^1$ represents a C4-C24 alkyl group or a C4-C24 alkenyl group; the average number n of moles of AO added is 1 to 80; and each AO is the same or different and represents a C2-C4 oxyalkylene group.

The number of carbon atoms of $R^1$ is preferably 8 or greater, more preferably 10 or greater, still more preferably 12 or greater, but is preferably 22 or smaller, more preferably 20 or smaller, still more preferably 18 or smaller.

The average number n is preferably 10 or greater, more preferably 13 or greater, but is preferably 60 or smaller, more preferably 50 or smaller, still more preferably 40 or smaller.

AO is preferably a C2-C3 oxyalkylene group (an oxyethylene group (EO) or oxypropylene group (PO)). When the $(AO)_n$ includes two or more types of oxyalkylene groups, the oxyalkylene groups may be arranged blockwise or randomly. When $R^1$ and n are within the above respective ranges or when AO is EO or PO, the advantageous effect can be well achieved.

Suitable examples of the polyoxyalkylene alkyl ethers and the polyoxyalkylene alkenyl ethers include compounds represented by the following formula (2):

$$R^2\text{—}O\text{-}(EO)_x(PO)_y\text{—}H \qquad (2)$$

wherein $R^2$ represents a C8-C22 alkyl group or a C8-C22 alkenyl group; EO represents an oxyethylene group; PO represents an oxypropylene group; the average number x of moles of EO added is 1 to 60; and the average number y of moles of PO added is 0 to 20.

The preferred range of the number of carbon atoms of $R^2$ is as described for $R^2$. $R^2$ may be either linear or branched and is preferably a linear alkyl or alkenyl group. The average number x is preferably 10 or greater, more preferably 13 or greater, but is preferably 50 or smaller, more preferably 40 or smaller. The average number y is preferably 10 or smaller, more preferably 4.5 or smaller, still more preferably 2.0 or smaller, and may be 0. When $R^2$, x, and y are within the above respective ranges, the advantageous effect can be well achieved.

EO and PO may be arranged blockwise or randomly. When EO and PO are arranged blockwise, the number of EO blocks and the number of PO blocks may each be one or two or more as long as the average numbers of moles of EO or PO added are within the above respective ranges. Moreover, when the number of EO blocks is two or more, the numbers of repeating EO units in the blocks may be the same as or different from each other. Also, when the number of PO blocks is two or more, the numbers of repeating PO units in the blocks may be the same as or different from each other. When EO and PO are arranged randomly, EO and PO may be arranged alternately or disorderly as long as the average numbers of moles thereof are within the above respective ranges.

Polyoxyethylene alkyl ethers and polyoxyethylene alkenyl ethers such as the compounds of formula (2) where y is 0 are suitable as the nonionic surfactants. In this case, the average number of moles of EO added, the type of alkyl group, and the type of alkenyl group are preferably as described above.

Specific examples of the polyoxyalkylene alkyl ethers and the polyoxyalkylene alkenyl ethers include polyoxyethylene stearyl ether, polyoxyethylene oleyl ether, polyoxyethylene cetyl ether, polyoxyethylene myristyl ether, polyoxyethylene lauryl ether, polyoxyethylene polyoxypropylene stearyl ether, polyoxyethylene polyoxypropylene oleyl ether, polyoxyethylene polyoxypropylene cetyl ether, polyoxyethylene polyoxypropylene myristyl ether, and polyoxyethylene polyoxypropylene lauryl ether. Preferred among these are polyoxyethylene stearyl ether, polyoxyethylene oleyl ether, and polyoxyethylene lauryl ether.

The HLB value (calculated by Griffin's method) of the nonionic surfactants (e.g., polyoxyalkylene alkyl ethers and polyoxyalkylene alkenyl ethers) is preferably 12 or greater, more preferably 13 or greater, but is preferably 19 or smaller, more preferably 17 or smaller.

Commercial products of the nonionic surfactants include EMULGEN 320P (formula (2): $R^2$=stearyl group, x=13, y=0), EMULGEN 420 (formula (2): $R^2$=oleyl group, x=20, y=0), EMULGEN 430 (formula (2): $R^2$=oleyl group, x=30, y=0), EMULGEN 150 (formula (2): $R^2$=lauryl group, x=40, y=0), EMULGEN 109P (formula (2): $R^2$=lauryl group, x=9, y=0), EMULGEN 120 (formula (2): $R^2$=lauryl group, x=12, y=0), and EMULGEN 220 (formula (2): $R^2$=cetyl group, x=12, y=0) all available from Kao Corporation.

The amount of the surfactants based on 100% by mass of the rubber solids in the natural rubber latexes is preferably 0.1 to 10% by mass, more preferably 0.3 to 5% by mass, still more preferably 0.5 to 3% by mass, from the standpoints of injectability at low temperatures and heat resistance.

The amount of the surfactants based on 100% by mass of the total puncture sealant is preferably 0.01 to 1.0% by mass. With an amount not lower than the lower limit, good injectability tends to be obtained, while with an amount not higher than the upper limit, good sealing performance tends to be obtained. The amount is more preferably 0.05 to 0.5% by mass, still more preferably 0.1 to 0.3% by mass.

The puncture sealant of the present disclosure may further contain other components as long as the advantageous effect is not inhibited. The puncture sealant of the present disclosure can be prepared by common methods. Specifically, it may be prepared, for example, by mixing the above-described and other components by a known technique.

EXAMPLES

The present disclosure will be specifically described by reference to, but not limited to, examples.

The following collectively describes the chemicals used in the examples and comparative examples.

Natural rubber latex: HA latex (Unimac Rubber, solid content: 61% by mass)

Tackifier: Nanolet (Yasuhara Chemical Co., Ltd., terpene resin, solid content: 50% by mass, aqueous dispersion)

Antifreezing agent 1: propylene glycol (The Dow Chemical Company)

Antifreezing agent 2: 1,3-propanediol (DuPont)

Protease inhibitor 1: EDTA 2Na (Akzo Nobel)

Protease inhibitor 2: 1,10-phenanthroline monohydrate (Tokyo Chemical Industry Co., Ltd.)

Phosphatase inhibitor: sodium orthovanadate (Fujifilm Wako Pure Chemical Corporation)

Antioxidant 1: NOCRAC CD (amine antioxidant, Ouchi Shinko Chemical Industrial Co., Ltd.)

Antioxidant 2: NOCRAC 200 (monophenolic antioxidant, Ouchi Shinko Chemical Industrial Co., Ltd.)

Antioxidant 3: NOCRAC NS-6 (bisphenolic antioxidant, Ouchi Shinko Chemical Industrial Co., Ltd.)

Antioxidant 4: NOCRAC NS-7 (polyphenolic antioxidant, Ouchi Shinko Chemical Industrial Co., Ltd.)

Examples and Comparative Examples

The antioxidants were mixed with water and the antifreezing agents to prepare antioxidant dispersions. Each of the antioxidant dispersions was mixed with the other materials according to the recipe shown in Table 1 to prepare puncture sealants.

A low-density polyethylene bottle was filled with each of the puncture sealants and then stored at an ambient temperature of 70° C. for 70 days. After the storage, the puncture seal durability of each puncture sealant was evaluated as follows. The results are shown in Table 1.

<Puncture Seal Durability>

A hole was made in a tread portion of a tire of size 195/65R15 using a nail having a diameter of 6 mm. After removal of the nail, 300 ml of the puncture sealant was injected into the punctured tire and the tire pressure was increased to 250 kPa. Then, the tire was run at a speed of 30 to 50 km/h for 10 minutes while a load of 3.5 kN was applied to the tire. Thereafter, the repaired tire was stored in a 25° C. environment for two hours, and the tire pressure was adjusted to 250 kPa. Then, the tire pressure was measured after a lapse of 24 hours, and the puncture seal durability was evaluated according to the following criteria:

Good: The tire pressure was 230 kPa or higher;
Poor: The tire pressure was lower than 230 kPa.

TABLE 1

| | | Comparative Example | | | Example | | | | |
|---|---|---|---|---|---|---|---|---|---|
| | | 1 | 2 | 3 | 1 | 2 | 3 | 4 | 5 |
| Formulation (parts by mass) | Natural rubber latex (solid content: 61 mass %) | 40 (24.4) | 40 (24.4) | 40 (24.4) | 40 (24.4) | 40 (24.4) | 40 (24.4) | 40 (24.4) | 40 (24.4) |
| | Tackifier (terpene resin, solid content: 50 mass %) | | | | | | | | |
| | Antifreezing agent 1 (propylene glycol) | 40 | 40 | 40 | 40 | 40 | 40 | 40 | 40 |
| | Antifreezing agent 2 (1,3-propanediol) | | | | | | | | |
| | Protease inhibitor 1 (EDTA 2Na) | | | 0.095 | 0.095 | 0.095 | 0.095 | 0.02 | 0.095 |
| | Protease inhibitor 2 (1,10-phenanthroline monohydrate) | | | | | | | | |
| | Phosphatase inhibitor (sodium orthovanadate) | | | | | | | | |
| | Antioxidant 1 (amine antioxidant) | | | | 0.15 | | | | |
| | Antioxidant 2 (monophenolic antioxidant) | | | | | 0.15 | | | |
| | Antioxidant 3 (bisphenolic antioxidant) | | 0.15 | | | | 0.15 | | |
| | Antioxidant 4 (polyphenolic antioxidant) | | | | | | | 0.15 | 0.15 |
| | Water (soft water) | 60.0 | 59.9 | 59.9 | 59.8 | 59.8 | 59.8 | 59.8 | 59.8 |
| Puncture seal durability | Tire pressure after lapse of 24 h | 130 kPa | 211 kPa | 190 kPa | 243 kPa | 246 kPa | 249 kPa | 244 kPa | 247 kPa |
| | Evaluation | Poor | Poor | Poor | Good | Good | Good | Good | Good |

| | | Example | | | | | | |
|---|---|---|---|---|---|---|---|---|
| | | 6 | 7 | 8 | 9 | 10 | 11 | 12 |
| Formulation (parts by mass) | Natural rubber latex (solid content: 61 mass %) | 40 (24.4) | 40 (24.4) | 40 (24.4) | 40 (24.4) | 40 (24.4) | 30 (18.3) | 40 (24.4) |
| | Tackifier (terpene resin, solid content: 50 mass %) | | | | | | 10 (5) | |
| | Antifreezing agent 1 (propylene glycol) | 40 | 40 | 40 | 40 | 40 | 40 | |
| | Antifreezing agent 2 (1,3-propanediol) | | | | | | | 40 |
| | Protease inhibitor 1 (EDTA 2Na) | | | | | | 0.05 | 0.05 |
| | Protease inhibitor 2 (1,10-phenanthroline monohydrate) | 0.05 | 0.05 | 0.05 | 0.05 | | | |
| | Phosphatase inhibitor (sodium orthovanadate) | | | | | 0.05 | | |
| | Antioxidant 1 (amine antioxidant) | 0.15 | | | | | | |
| | Antioxidant 2 (monophenolic antioxidant) | | 0.15 | | | | | |

TABLE 1-continued

| | | | | | | | | |
|---|---|---|---|---|---|---|---|---|
| | Antioxidant 3 (bisphenolic antioxidant) | | | | 0.15 | | 0.15 | 0.15 | 0.15 |
| | Antioxidant 4 (polyphenolic antioxidant) | | | | | 0.15 | | | |
| | Water (soft water) | 59.8 | 59.8 | 59.8 | 59.8 | 59.8 | 59.8 | 59.8 |
| Puncture seal durability | Tire pressure after lapse of 24 h | 243 kPa | 248 kPa | 244 kPa | 243 kPa | 243 kPa | 246 kPa | 246 kPa |
| | Evaluation | Good | Good | Good | Good | Good | Good | Good |

As shown in Table 1, each of the puncture sealants of the examples was a puncture sealant containing at least one natural rubber latex and at least one antifreezing agent as well as two additional components, i.e., at least one antioxidant and at least one selected from the group consisting of protease inhibitors and phosphatase inhibitors, and such puncture sealants, even when stored for a long time, prevented a decrease in tire pressure after puncture repairing and exhibited excellent puncture seal durability as compared to the comparative examples containing neither or only one of the additional components.

Exemplary embodiments of the present disclosure include:

Embodiment 1. A puncture sealant, comprising:
at least one natural rubber latex;
at least one antioxidant;
at least one antifreezing agent; and
at least one selected from the group consisting of protease inhibitors and phosphatase inhibitors.

Embodiment 2. The puncture sealant according to Embodiment 1, further comprising at least one surfactant.

Embodiment 3. The puncture sealant according to Embodiment 1 or 2,
wherein the protease inhibitors are metal protease inhibitors.

Embodiment 4. The puncture sealant according to any one of Embodiments 1 to 3,
wherein the antioxidant is at least one selected from the group consisting of phenolic antioxidants and amine antioxidants.

Embodiment 5. The puncture sealant according to any one of Embodiments 1 to 4, further comprising at least one tackifying resin.

Embodiment 6. The puncture sealant according to any one of Embodiments 1 to 5,
wherein the antifreezing agent is at least one selected from the group consisting of ethylene glycol, propylene glycol (1,2-propanediol), and 1,3-propanediol.

Embodiment 7. The puncture sealant according to any one of Embodiments 3 to 6,
wherein the metal protease inhibitors are selected from the group consisting of dibasic acids, tribasic acids, ethylenediaminetetraacetic acid and salts thereof, and 1,10-phenanthroline.

Embodiment 8. The puncture sealant according to any one of Embodiments 1 to 7,
wherein the puncture sealant comprises, based on 100% by mass of the total puncture sealant, 15 to 45% by mass of the at least one natural rubber latex (in terms of rubber solids), 0.01 to 3% by mass of the at least one antioxidant, 20 to 64% by mass of the at least one antifreezing agent, and 0.001 to 0.5% by mass in total of the at least one selected from the group consisting of protease inhibitors and phosphatase inhibitors.

Embodiment 9. The puncture sealant according to any one of Embodiments 2 to 8,
wherein the puncture sealant comprises, based on 100% by mass of the total puncture sealant, 0.01 to 1.0% by mass of the at least one surfactant.

Embodiment 10. The puncture sealant according to any one of Embodiments 5 to 9,
wherein the puncture sealant comprises, based on 100% by mass of the total puncture sealant, 2 to 10% by mass of the at least one tackifying resin.

The invention claimed is:

1. A puncture sealant, comprising:
at least one natural rubber latex;
at least one antioxidant;
at least one antifreezing agent; and
at least one phosphatase inhibitor,
wherein the puncture sealant comprises, based on 100% by mass of the total puncture sealant, 0.01 to 1% by mass of the at least one antioxidant.

2. The puncture sealant according to claim 1, further comprising at least one surfactant.

3. The puncture sealant according to claim 1, wherein the antioxidant is at least one selected from the group consisting of phenolic antioxidants and amine antioxidants.

4. The puncture sealant according to claim 1, further comprising at least one tackifying resin.

5. The puncture sealant according to claim 1, wherein the antifreezing agent is at least one selected from the group consisting of ethylene glycol, propylene glycol (1,2-propanediol), and 1,3-propanediol.

6. The puncture sealant according to claim 1, wherein the puncture sealant comprises, based on 100% by mass of the total puncture sealant, 15 to 45% by mass of the at least one natural rubber latex (in terms of rubber solids), 20 to 64% by mass of the at least one antifreezing agent, and 0.001 to 0.5% by mass in total of the at least one phosphatase inhibitor.

7. The puncture sealant according to claim 2, wherein the puncture sealant comprises, based on 100% by mass of the total puncture sealant, 0.01 to 1.0% by mass of the at least one surfactant.

8. The puncture sealant according to claim 4, wherein the puncture sealant comprises, based on 100% by mass of the total puncture sealant, 2 to 10% by mass of the at least one tackifying resin.

* * * * *